(12) United States Patent
Yang et al.

(10) Patent No.: US 8,287,169 B2
(45) Date of Patent: Oct. 16, 2012

(54) BACKLIGHT AND DISPLAYING/IMAGING APPARATUS

(75) Inventors: Ying Bao Yang, Kanagawa (JP);
Takafumi Suzuki, Aichi (JP); Susumu Kimura, Tokyo (JP); Masaru Higuchi, Tokyo (JP); Masaki Kondoh, Kanagawa (JP)

(73) Assignee: Sony Corporation (JP)

( * ) Notice: Subject to any disclaimer, the term of this patent is extended or adjusted under 35 U.S.C. 154(b) by 404 days.

(21) Appl. No.: 12/661,201

(22) Filed: Mar. 12, 2010

(65) Prior Publication Data
US 2010/0246212 A1 Sep. 30, 2010

(30) Foreign Application Priority Data

Mar. 26, 2009 (JP) ............................. P2009-076322

(51) Int. Cl.
*F21V 7/04* (2006.01)
(52) U.S. Cl. ........ 362/607; 362/601; 362/602; 362/612; 362/615; 362/623
(58) Field of Classification Search .................. 362/601, 362/602, 607, 612, 615, 623
See application file for complete search history.

(56) References Cited

U.S. PATENT DOCUMENTS

| | | | | |
|---|---|---|---|---|
| 7,293,899 | B2 * | 11/2007 | Boyd et al. | 362/296.07 |
| 7,322,731 | B2 * | 1/2008 | Epstein et al. | 362/609 |
| 8,096,693 | B2 * | 1/2012 | Taya et al. | 362/607 |
| 2006/0103637 | A1 | 5/2006 | Yamaguchi et al. | |
| 2009/0159786 | A1 * | 6/2009 | Yang et al. | 250/227.29 |

FOREIGN PATENT DOCUMENTS

JP 2006-127212 A 5/2006

* cited by examiner

*Primary Examiner* — Stephen F Husar
*Assistant Examiner* — James Cranson, Jr.
(74) *Attorney, Agent, or Firm* — Lerner, David, Littenberg, Krumholz & Mentlik, LLP

(57) ABSTRACT

The present invention provides a backlight capable of suppressing loss of light from an invisible light source and a displaying/imaging apparatus using the same. The backlight includes: a light guide plate having a light emitting face and a rear face opposed to the light emitting face; a visible light source disposed on a side face of the light guide plate; an invisible light source disposed on a side face of the light guide plate; a first reflection film disposed on the rear face side of the light guide plate, reflecting light from the visible light source, and transmitting light from the invisible light source; and a second reflection film disposed on the rear face side of the light guide plate and reflecting light from at least the invisible light source out of the visible light source and the invisible light source.

5 Claims, 10 Drawing Sheets

BACKLIGHT AND DISPLAYING/IMAGING APPARATUS

CROSS-REFERENCE TO RELATED APPLICATION

The present application claims priority from Japanese Patent Application No. JP 2009-076322 filed in the Japanese Patent Office on Mar. 26, 2009, the entire content of which is incorporated herein by reference.

BACKGROUND OF THE INVENTION

1. Field of the Invention

The present invention relates to a backlight and a displaying/imaging apparatus having the same.

2. Description of the Related Art

There is a displaying/imaging apparatus in which a display cell including one display element and a light receiving cell including one light receiving element are formed in a part of a liquid-crystal or organic-EL display device or in each pixel to enable light receiving operation together with display operation to be performed (see, for example, Japanese Unexamined Patent Application Publication No. 2006-127212). The light receiving cell is an optical sensor circuit including a photoelectric conversion element such as a photodiode as a light receiving element, and a TFT (Thin Film Transistor) as a switching element. In such a displaying/imaging apparatus, information as output of the light receiving cell is used for input or space position detection.

SUMMARY OF THE INVENTION

In the case of the displaying/imaging apparatus using liquid crystal, to enable position detection also in black display, it is desirable to use a backlight having an invisible light source of infrared light or the like. However, in a common backlight, optical members such as a light guide plate, a reflection film, and a lens film are formed so as to extract white light efficiently in the surface of the light guide plate, and there is a case that excellent characteristics are not obtained with respect to invisible light. For example, since the reflectance of invisible light in a reflection film is extremely low, the invisible light passes through without being reflected, and loss is large.

It is therefore desirable to provide a backlight capable of suppressing loss of light from an invisible light source and a displaying/imaging apparatus using the same.

A backlight of an embodiment of the present invention includes the following elements (A) to (E);

(A) a light guide plate having a light emitting face and a rear face opposed to the light emitting face (B) a visible light source disposed on a side face of the light guide plate (C) an invisible light source disposed on a side face of the light guide plate (D) a first reflection film disposed on the rear face side of the light guide plate, reflecting light from the visible light source, and transmitting light from the invisible light source (E) a second reflection film disposed on the rear face side of the light guide plate and reflecting light from at least the invisible light source out of the visible light source and the invisible light source A displaying/imaging apparatus of an embodiment of the present invention includes: an input/output panel having a display element and a light receiving element; and a backlight emitting light to the input/output panel. The backlight is the above-described backlight of an embodiment of the invention.

In the backlight of an embodiment of the invention, on the rear face side of the light guide plate, the first reflection film reflecting the light from the visible light source and transmitting the light from the invisible light source, and the second reflection film reflecting the light from at least the invisible light source out of the visible light source and the invisible light source are provided. Therefore, even in the case where the light from the invisible light source goes out on the rear face side of the light guide plate, it is reflected by the second reflection film and enters again on the rear face of the light guide plate. Consequently, even in the case where light from the invisible light source passes through the first reflection film, loss of the light from the invisible light source is suppressed. On the other hand, light from the visible light source is reflected by the first reflection film and enters on the rear face of the light guide plate.

Since the displaying/imaging apparatus of an embodiment of the invention has the backlight of an embodiment of the invention, loss of invisible light in the backlight is suppressed. Therefore, power consumption is reduced.

According to the backlight of an embodiment of the invention, on the rear face side of the light guide plate, the first reflection film reflecting the light from the visible light source and transmitting the light from the invisible light source, and the second reflection film reflecting the light from at least the invisible light source out of the visible light source and the invisible light source are provided, so that loss of the light from the invisible light source is suppressed. Therefore, when a displaying/imaging apparatus is constructed by using the backlight, reduction in power consumption is realized.

Other and further objects, features and advantages of the invention will appear more fully from the following description.

DETAILED DESCRIPTION OF THE PREFERRED EMBODIMENTS

Embodiments of the present invention will be described in detail below with reference to the drawings. The description will be given in the following order.

(1) embodiment (the case where a second reflection film reflects both of visible light and invisible light)

(2) modification (example of providing first and second reflection films in this order on the back side of a light guide plate in the case where the second reflection film transmits visible light and reflects invisible light)

Embodiment

Figure 1:
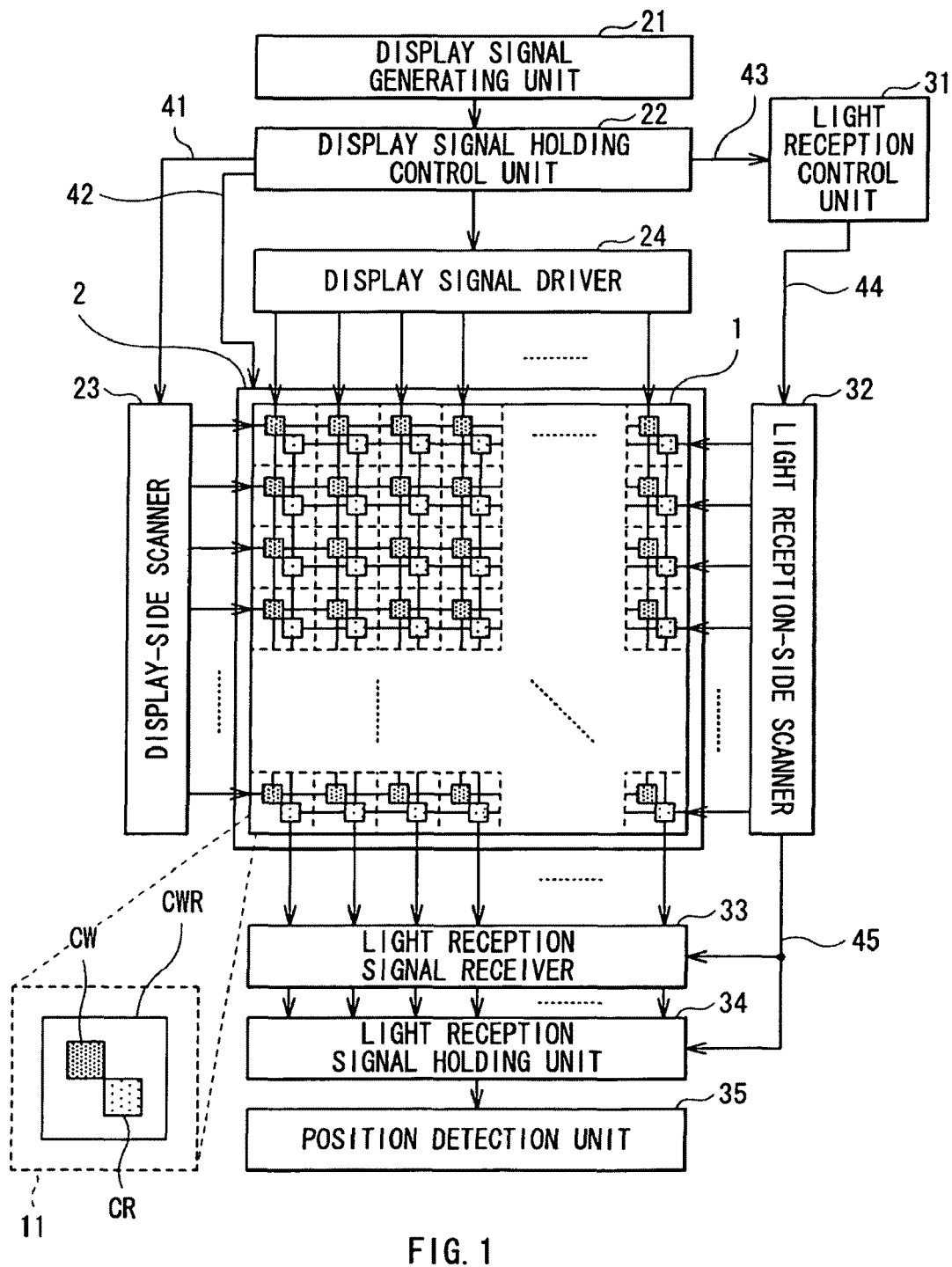
FIG. 1 is a block diagram illustrating a general configuration of a displaying/imaging apparatus according to an embodiment of the present invention.

FIG. 1 illustrates a schematic configuration of a displaying/imaging apparatus according to an embodiment of the present invention. The displaying/imaging apparatus is used for a medium-size or large-size display apparatus such as a liquid crystal television or a mobile device such as a cellular phone or a game machine. The displaying/imaging apparatus has, for example, an input/output panel 1 and a backlight 2. The displaying/imaging apparatus has a display signal generating unit 21, a display signal holding control unit 22, a display-side scanner 23, a display signal driver 24, a light reception control unit 31, a light reception-side scanner 32, a light reception signal receiver 33, a light reception signal holding unit 34, and a position detecting unit 35.

In the entire input/output panel 1, a plurality of pixels 11 are disposed in a matrix, and an image of a predetermined figure, a character, or the like is displayed while performing line-sequential operation. Each pixel 11 is constructed by a display/light-receiving cell CWR having a display cell CW including one display element and a light receiving cell CR including one light receiving element.

The backlight 2 is a light source that emits light to the input/output panel 1. The configuration of the backlight 2 will be described later.

The display signal generating unit 21 generates a display signal for displaying, for example, a screen (frame) by the screen (frame) on the basis of data generated by a not-illustrated CPU (Central Processing Unit) or the like and supplied from the CPU. The display signal generating unit 21 supplies the generated display signal to the display signal holding control unit 22.

The display signal holding control unit 22 stores and holds the display signals supplied from the display signal generating unit 21 by the screen (frame) in a frame memory such as an SRAM (Static Random Access Memory). The display signal holding control unit 22 controls the operation of the display-side scanner 23 and the display signal driver 24 driving the display cells CW. Concretely, the display signal holding control unit 22 supplies a display timing control signal 41 instructing a timing of display to the display-side scanner 23 and supplies display signals of one horizontal line to the display signal driver 24 on the basis of the display signals held in the frame memory. Further, by supplying a light-on timing control signal 42 to the backlight 2, the display signal holding control unit 22 controls the timing of light emission of the backlight 2. In addition, the display signal holding control unit 22 controls the operation timing of the light reception control unit 31 which will be described later. Concretely, the display signal holding control unit 22 supplies a vertical synchronization signal 43 indicative of timing of a frame, a signal indicative of whether the backlight 2 is turned on or not, and a signal indicative of whether scan of a selection signal for displaying the entire input/output panel 1 has been finished or not to the light reception control unit 31.

The display-side scanner 23 selects the display cell CW to be driven in accordance with the display timing control signal 41 output from the display signal holding control unit 22. Concretely, the display-side scanner 23 supplies a display selection signal via a display gate line connected to each of the pixels 11 in the input/output panel 1.

The display signal driver 24 supplies display data to the display cells CW to be driven in accordance with the display signals of one horizontal line output from the display signal holding control unit 22. Concretely, the display signal driver 24 supplies voltage corresponding to display data to the pixel 11 selected by the display-side scanner 23 via the data supply line connected to each pixel 11 in the input/output panel 1.

The light reception control unit 31 controls the light receiving operation of the entire input/output panel 1. Concretely, to the light reception control unit 31, the vertical synchronization signal 43, the signal indicative of whether the backlight 2 is turned on or not, and a signal indicative of whether scan of a selection signal for displaying the entire input/output panel 1 has been finished or not are supplied from the display signal holding control unit 22. The light reception control unit 31 supplies a light reception timing control signal 44 to the light reception-side scanner 32 on the basis of any of the signals.

The light reception-side scanner 32 selects the light receiving cell CR to be driven in accordance with the light reception timing control signal 44 output from the light reception control unit 31. The light reception-side scanner 32 supplies a light reception selection signal to each pixel 11 via a light reception gate line connected to each pixel 11 in the input/output panel 1. The light reception-side scanner 32 outputs a light reception block control signal 45 to the light reception signal receiver 33 and the light reception signal holding unit 34, thereby controlling the light reception signal receiver 33 and the light reception signal holding unit 34.

The light reception signal receiver 33 obtains light reception signals of one horizontal line output from the light receiving cells CR in accordance with the light reception block control signal 45 output from the light reception-side scanner 32. The light reception signal receiver 33 outputs the obtained light reception signals of one horizontal line to the light reception signal holding unit 34.

The light reception signal holding unit 34 reconstructs light reception signals output from the light reception signal receiver 33 to light reception signals on the screen (frame) unit basis in accordance with the light reception block control signal 45 output from the light reception-side scanner 32, and stores and holds the light reception signals in a frame memory which is, for example, an SRAM. The data of the light reception signal stored in the light reception signal holding unit 34 is output to the position detecting unit 35. The light reception signal holding unit 34 may be constructed by a storage device other than a memory and may hold, for example, data of a reception signal as analog data.

The position detecting unit 35 performs signal process on the basis of the data of the light reception signal output from the light reception signal holding unit 34 to specify the position of a detected thing in the light receiving cell CR. Consequently, the position of the thing which is in contact or adjacent (for example, a finger of the user) is specified. In the case where the light reception signal holding unit 34 stores data of the light reception signal as analog data, analog/digital (A/D) conversion is performed in the position detecting unit 35 and, after that, the signal process is executed.

To the display signal holding control unit 22 and the light reception control unit 31, a drive (not illustrated) may be connected via an interface (not illustrated) as necessary. The drive reads out a program recorded on a magnetic disk, an optical disk, a magnetooptic disk, a semiconductor memory, or the like which is loaded, supplies the program to the display signal holding control unit 22 or the light reception control unit 31, and makes it executed.

Figure 2B:
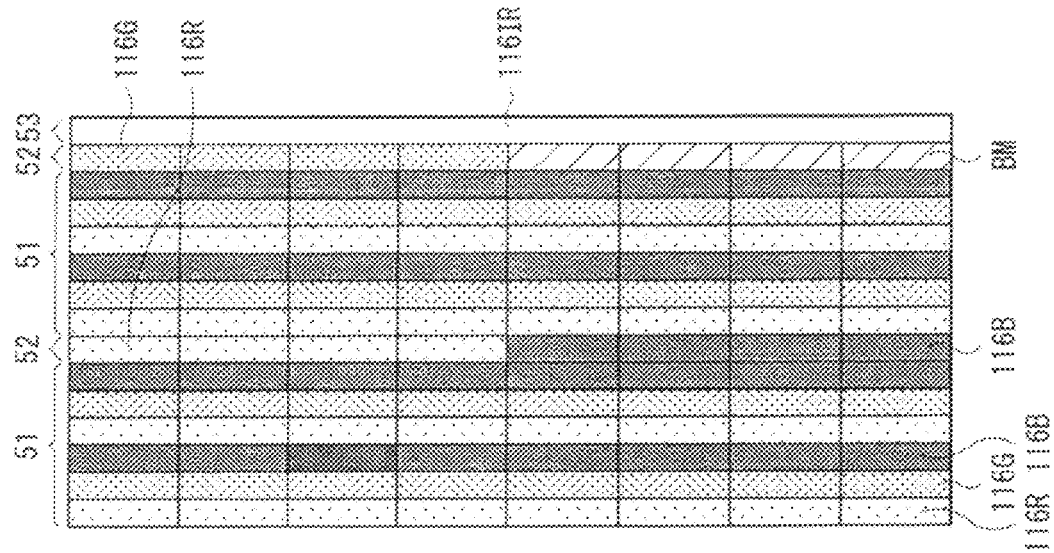
FIGS. 2A and 2B are plan views illustrating the configuration of an input/output panel illustrated in FIG. 1.
Figure 2A:
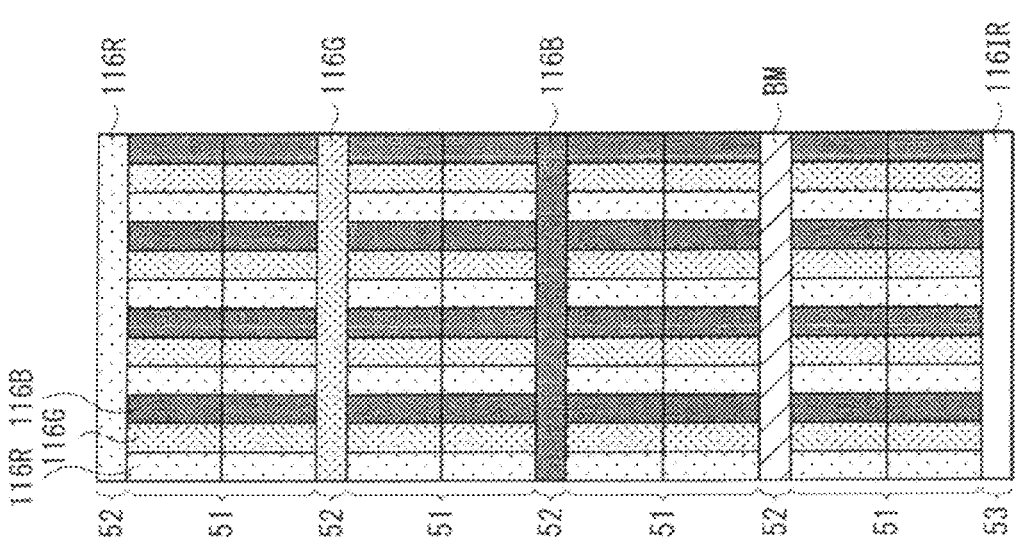
Figure 3:
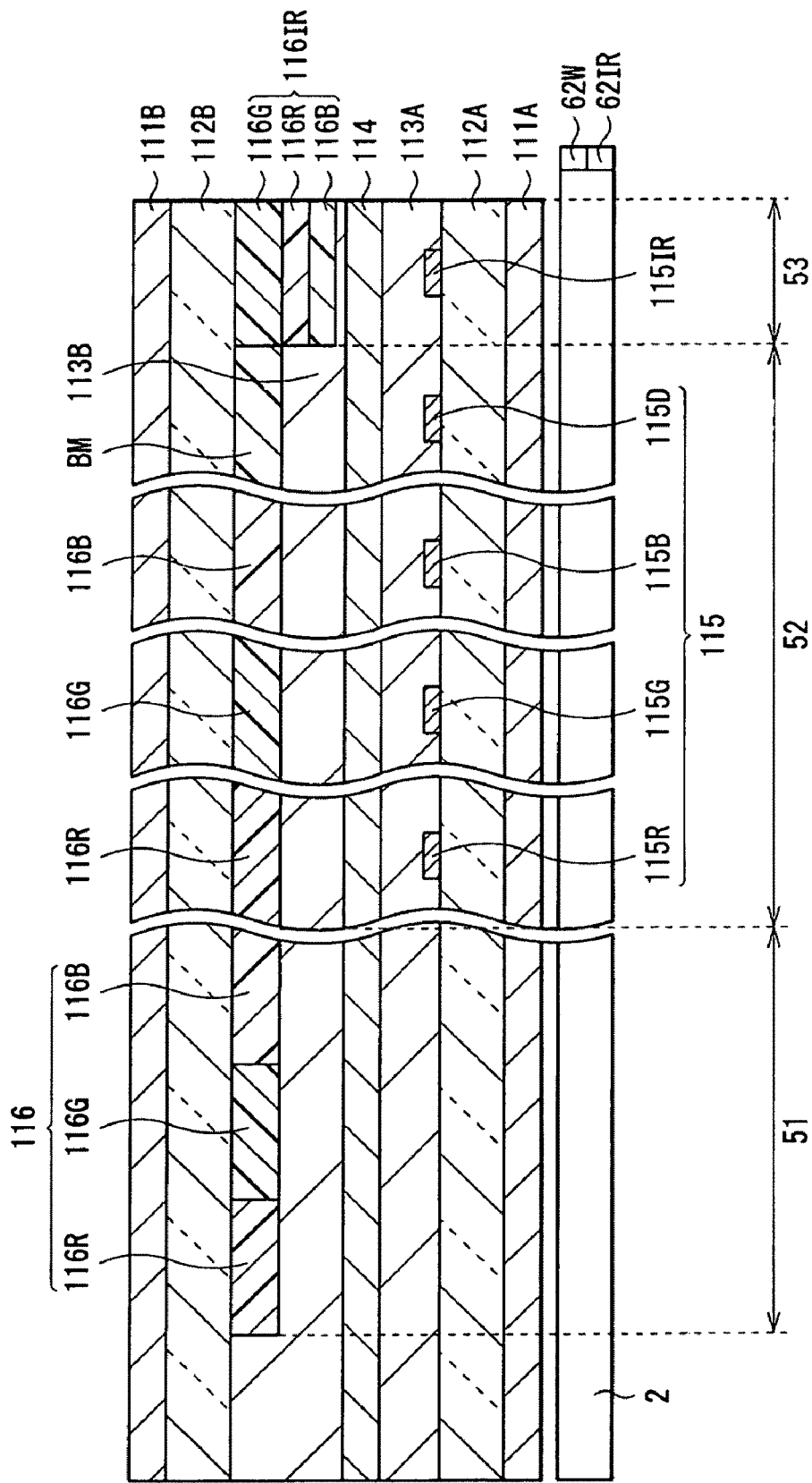
FIG. 3 is a cross section illustrating the configuration of the input/output panel illustrated in FIG. 1.

FIGS. 2A and 2B and FIG. 3 schematically illustrate a plane configuration and a sectional configuration of the input/output panel 1. The input/output panel 1 includes a pair of polarizers 111A and 111B, a pair of transparent substrates 112A and 112B, planarization films 113A and 113B, and a liquid crystal layer 114. On the side where the polarizer 111A is provided of the transparent substrate 112A, that is, on the rear side of the input/output panel 1, the backlight 2 is disposed.

The transparent substrate 112A is a TFT substrate on which, for example, TFTs (Thin Film Transistors), various drive circuits, pixel electrodes, and the like are formed. The transparent substrate 112B is an opposed substrate on which color filters, opposite electrodes, and the like are formed. The polarizers 111A and 111B are adhered to each other so that their polarizing axes are orthogonal to each other. The polarization films 113A and 113B are provided to planarize the surface of the transparent substrates 112A and 112B on which light receiving sensors 115 or color filters 116 to be described later are provided. The liquid crystal layer 114 is provided between the planarization films 113A and 113B.

The input/output panel 1 has, for example, a display region 51 for each pixel and a visible light receiving region 52 that receives white light as visible light and also has, in a part of the screen, an invisible light receiving region 53 that receives infrared light as invisible light. The disposition of the display region 51, the visible light receiving region 52, and the invisible light receiving region 53 is not limited. The disposition of FIG. 2A or 2B may be also employed.

In the display region 51, in correspondence with each pixel, a color filter 116R for red, a color filter 116G for green, and a color filter 116B for blue (hereinbelow, generically called color filters 116) are provided. The color filters 116 are disposed, for example, between the transparent substrate 112B and the planarization film 113B.

In the visible light receiving region 52, the light receiving sensor 115, the color filter 116R for red, the color filter 116G for green, the color filter 116B for blue, and a black matrix BM are formed. The light receiving sensor 115 has the function of the plurality of kinds of light receiving sensors 115R, 115G, and 115B capable of receiving light having different wavelength regions by being combined with any one of the color filter 116R for red, the color filter 116G for green, and the color filter 116B for blue. Concretely, the light receiving sensor 115R receives red light, the light receiving sensor 115G receives green light, and the light receiving sensor 115B receives blue light. The light receiving sensor 115D is a dummy sensor. The light receiving sensors 115 are disposed between the transparent substrate 112A and the planarization film 113A. The color filters 116 and the black matrix BM are disposed between the transparent substrate 112B and the planarization film 113B.

In the invisible light receiving region 53, an IR sensor 115IR receiving infrared light as invisible light and an IR filter 116IR cutting visible light and transmitting only infrared light are formed. The IR filter 116IR is realized by, for example, stacking color filters of R and B or color filters of R, G, and B. The RGB stacked layers have higher performance of cutting the visible light than the RB stacked layers. FIG. 3 illustrates the case of using the RGB stacked layers.

Figure 4:
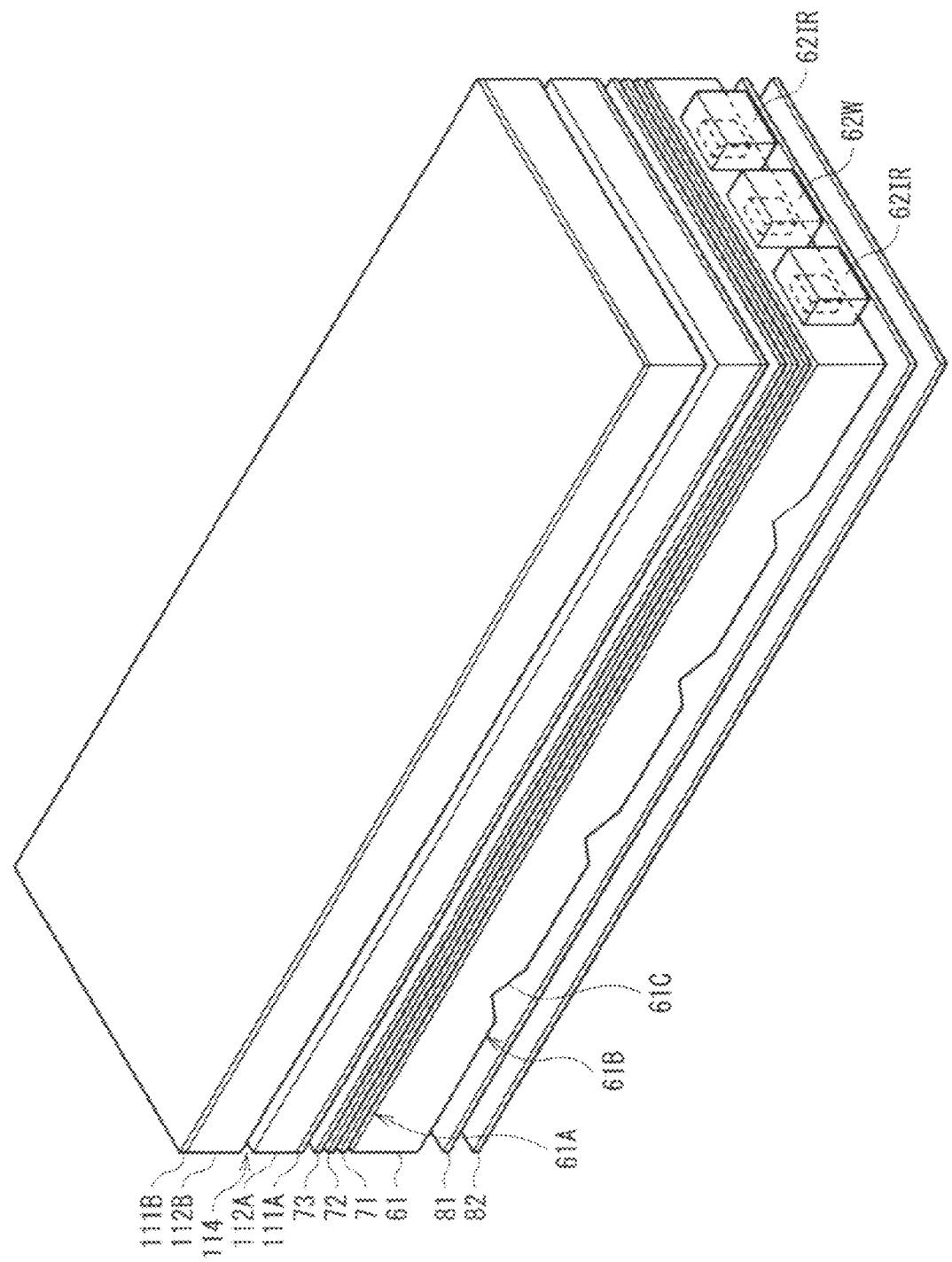
FIG. 4 is a perspective view illustrating the configuration of a backlight illustrated in FIG. 1.
Figure 5:
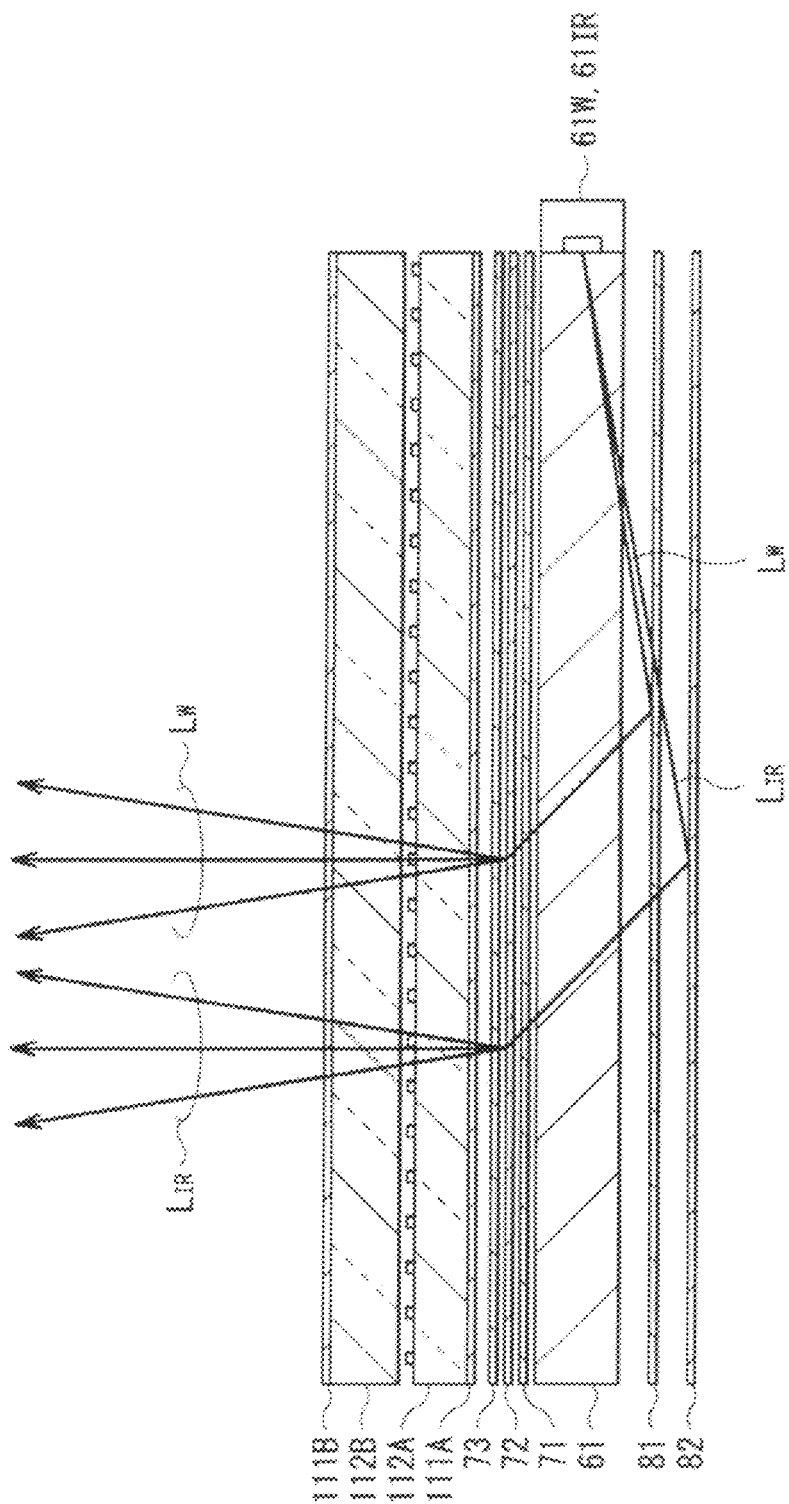
FIG. 5 is a cross section illustrating the configuration of the backlight illustrated in FIG. 4.

FIGS. 4 and 5 illustrate the configuration of the backlight 2. In the backlight 2, for example, a white LED 62W as a white light source as a visible light source and an IR LED 62IR as an infrared light source as an invisible light source are disposed on a side face of a light guide plate 61 having a parallel plate shape.

The light guide plate 61 is made of, for example, polycarbonate or polyethylene terephthalate, and has a light emitting face (top face) 61A and a rear face 62B facing the light emitting face 61A. In the rear face 61B of the light guide plate 61, for example, a plurality of grooves 61C are formed as process for extracting light. By the grooves 61C, the total reflection condition of light propagating in the light guide plate 61 is not satisfied (the angle becomes equal to or less than the critical angle). The light goes out from the light emitting face 61A of the light guide plate 61.

On the light emitting face 61A side of the light guide plate 61, that is, between the backlight 2 and the input/output panel 1, optical members such as a diffuser 71, a diffusion film 72, and a lens film 73 are disposed. The diffuser 71 diffuses incident light from the rear face to uniformize the intensity distribution and is made of, for example, polycarbonate, polyethylene terephthalate, or the like. The diffusion film 72 diffuses incident light to uniformize the intensity distribution. In the lens film 73, a plurality of projections each having a prism shape (triangular prism) are arranged in the same plane. The lens film 73 has the function of condensing incident light, for example, in the front face direction.

On the rear face 61B side of the light guide plate 61, first and second reflection films 81 and 82 are provided. The first reflection film 81 reflects light (white light) $L_W$ from the white LED 62W and transmits light (infrared light) $L_{IR}$ from the IR LED 62IR. The second reflection film 82 reflects at least the light $L_{IR}$ from the IR LED 62IR out of the white LED 62W and the IR LED 62IR. Therefore, in the displaying/imaging apparatus, loss of the light $L_{IR}$ from the IR LED 62IR is suppressed.

Concretely, the second reflection film 82 reflects the light $L_W$ and $L_{IR}$ from the white LED 62W and the IR LED 62IR, and is disposed on the rear side opposite to the light reflection face of the first reflection film 81.

The first reflection film 81 is constructed by an optical multilayer reflection film made of polyester or the like (for example, "ESR (trade name)"). By controlling the thickness of the multilayer film, the reflectance with respect to visible light increases. The second reflection film 82 is obtained, for example, by forming a silver (Ag) layer by vapor deposition on the surface of a white PET plate.

Figure 6:
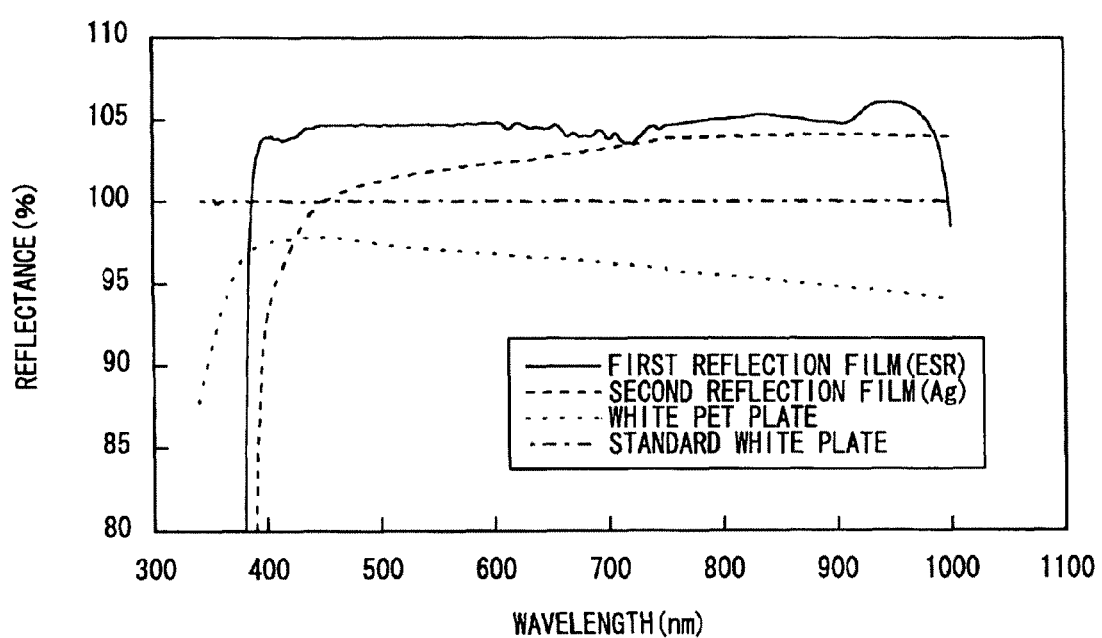
FIG. 6 is a diagram illustrating a result of examination of reflectance in the perpendicular direction of first and second reflection films illustrated in FIG. 4.

FIG. 6 shows the result of examination of the reflectance in the vertical direction of the first and second reflection films 81 and 82. In FIG. 6, reflectance in the vertical direction of a white PET plate having no silver layer and that of a standard white plate are also illustrated.

As understood from FIG. 6, the reflectance with respect to both of white light and infrared light enter perpendicular to the first reflection film 81 or the second reflection film 82 is almost 100% and there is hardly any difference.

Figure 7:
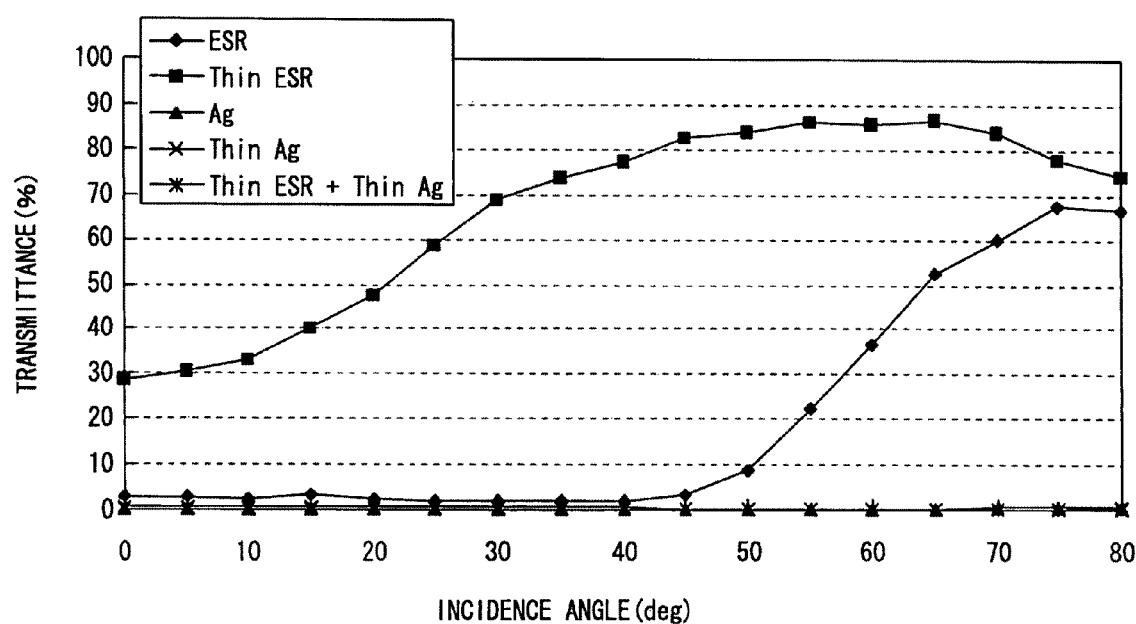
FIG. 7 is a diagram illustrating a result of examination on the relation between the reflectance of the first and second reflection films illustrated in FIG. 4 and incidence angle.
Figure 8A:
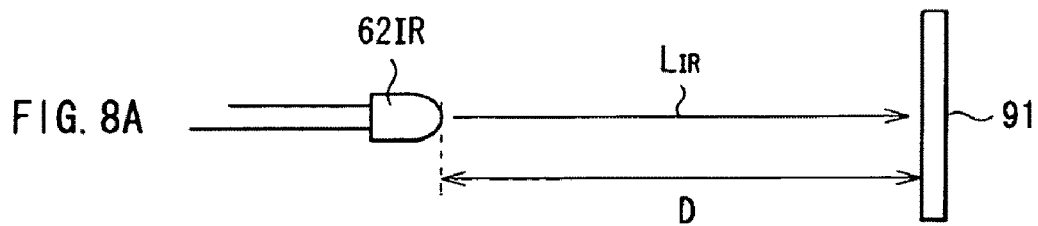
FIGS. 8A to 8D are diagrams for explaining a method of measuring the relation between the reflectance of the first and second reflection films and the incidence angle illustrated in FIG. 7.
Figure 8B:
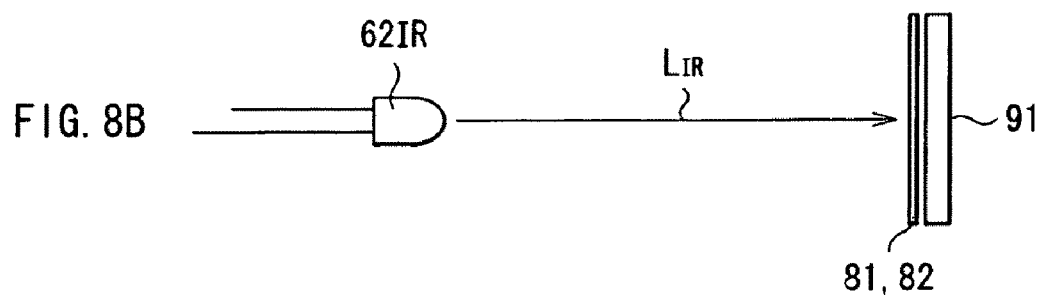
Figure 8C:
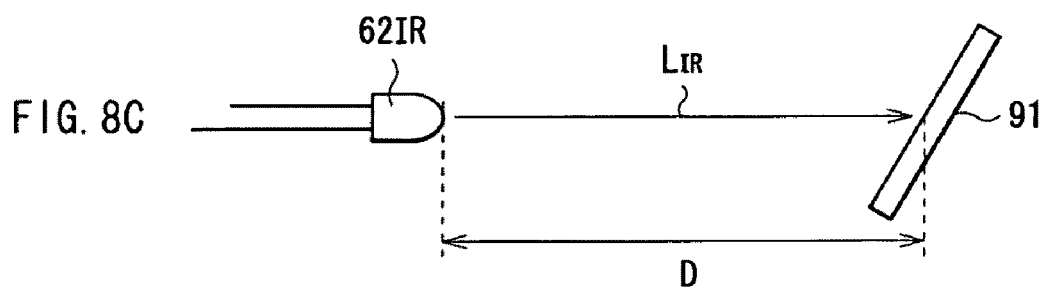
Figure 8D:
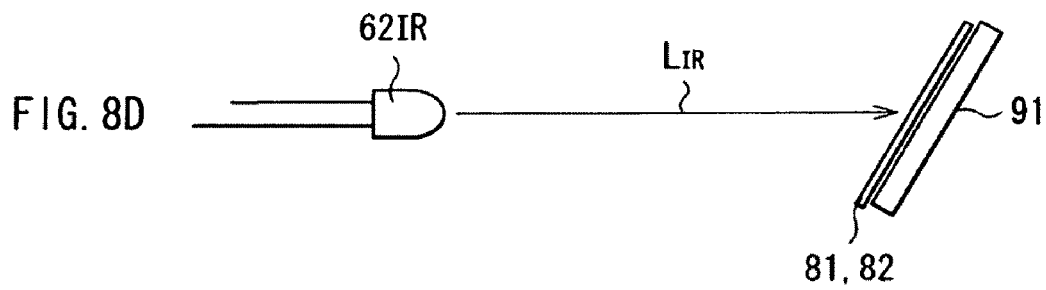

FIG. 7 illustrates the result of examination of the relation between transmittance with respect to infrared light (wavelength 850 nm) of the first and second reflection films 81 and 82 and incidence angle. Measurement was made as illustrated in FIGS. 8A to 8D. First, as illustrated in FIG. 8A, the IR LED 62IR which is a round LED having a wavelength of 850 nm was prepared, and output of the light $L_{IR}$ from the IR LED 62IR was measured. A detector 91 of a power meter was disposed in the vertical direction, and distance D between the IR LED 62IR and the detector 91 was set to 30 mm. As illustrated in FIG. 8B, the first reflection film 81 and/or the second reflection film 82 were/was disposed in front of the detector 91, outputs of the light $L_{IR}$ were measured, and the ratio in the case where there was the reflection film and that in the case where there was no reflection film were obtained. As the first reflection film 81, two kinds of "ESR (trade name)" as optical multilayer reflection films made of polyester or the like and having different thicknesses were used. In FIG. 7, the film having the same thickness as that used in the measurement of FIG. 6 is expressed as "ESR", and the thinner film is expressed as "thin ESR". As the second reflection film 82, two kinds of films each obtained by forming a silver (Ag) layer on the surface of a white PET plate by vapor deposition and having different thicknesses of the silver layer were used. In FIG. 7, the film having the same thickness as that used in measurement of FIG. 6 is expressed as "Ag", and the thinner film is expressed as "thin Ag". Subsequently, as illustrated in FIGS. 8C and 8D, the detector 91 was tilted each time by five degrees, and similar measurement was repeated.

As understood from FIG. 7, with respect to the first reflection film 81, as the incidence angle increases, the transmittance becomes higher. In particular, in the case where the incidence angle is 70 degrees or more, the transmittance reaches 50%. It is therefore found out that decrease in the reflectance with respect to infrared light of the first reflection film 81 is caused by transmittance of infrared light. The angle of light traveling from the light guide plate 61 to the rear face 61B side is about 60 to 70 degrees. To increase the infrared light intensity in the light emitting face 61A of the light guide plate 61, the reflectance of light in the direction of 60 to 70 degrees is important. However, the reflectance of the first reflection film 81 with respect to infrared light which is incident at 60 to 70 degrees is low, so that the infrared light intensity in the light emitting face 61A of the light guide plate 61 becomes low.

FIG. 7 also illustrates the result ("Thin ESR+Thin Ag") of examination on the relation between the reflectance and the incidence angle using both the thinner one of the two kinds of "ESR" films used in FIG. 7 as the first reflection film 81 and the thinner one of the two kinds of silver layers used in FIG. 7 as the second reflection film 82. As understood from the result, in the case of using both of the first and second reflection films 81 and 82, the transmittance is suppressed low even when the incidence angle is changed, and decrease in the reflectance at 60 to 70 degrees is not seen.

Figure 9:
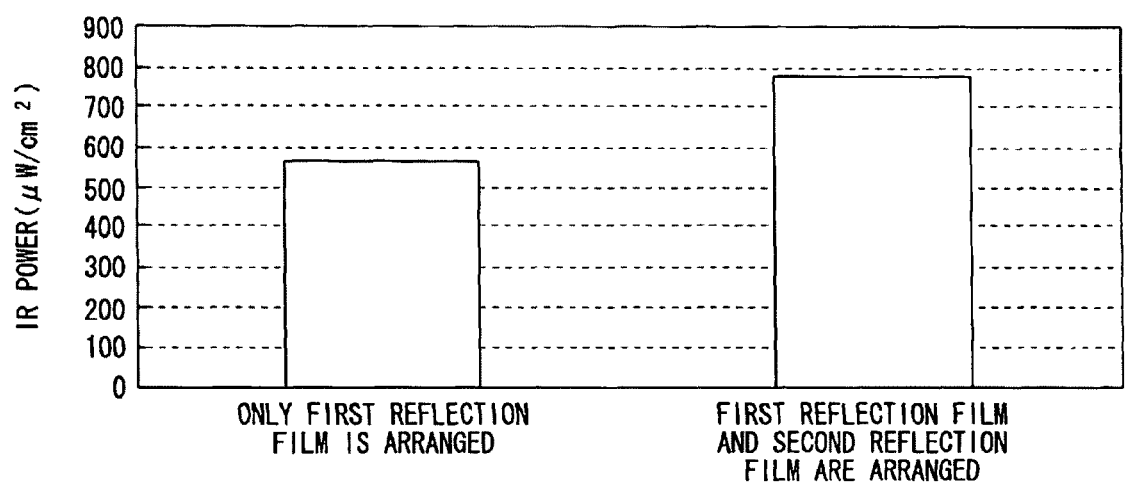
FIG. 9 is a diagram illustrating a result of examination of intensity of infrared light in the surface (light outgoing surface) of a light guide plate of the backlight illustrated in FIG. 4.

FIG. 9 is a diagram illustrating the result of examination of infrared light intensity in the light emitting face 61A of the light guide plate 61 with respect to the backlight 2 having the first and second reflection films 81 and 82 as illustrated in FIG. 5 in comparison with the case where only the first reflection film 81 is disposed. As understood from FIG. 9, in the case of disposing the first and second reflection films 81 and 82, as compared with the case of disposing only the first reflection film 81, the infrared light intensity in the light emitting face 61A of the light guide plate 61 was increased by about 38%.

The displaying/imaging apparatus is manufactured by an ordinary method of manufacturing a liquid crystal displaying/imaging apparatus except that, for example, the second reflection film 82 is obtained by forming a silver layer on the surface of a white PET plate by vapor deposition or the like and the second reflection film 82 is disposed on the rear face side of the first reflection film 81.

In the displaying/imaging apparatus, when the display selection signal is applied from the display-side scanner 23 to a predetermined pixel 11, display operation corresponding to voltage supplied from the display signal driver 24 is performed in the pixel 11. By line-sequential operation of the display-side scanner 23 and the display signal driver 24, an image corresponding to arbitrary display data is displayed on the input/output panel 1.

When the selection signal for light reception is supplied from the light reception-side scanner 32 to a predetermined pixel 11 in accordance with the light reception timing control signal 44 output from the light reception control unit 31, a light reception signal corresponding to the amount of light detected by the light receiving sensor 115 of the pixel 11 is output from the pixel 11 to the light reception signal receiver 33. The light reception signals are reconstructed to light reception signals on the screen (frame) unit basis in the light reception signal holding unit 34, and are stored in a frame memory and output to the position detecting unit 35. The position detecting unit 35 performs signal process on the basis of data of the light reception signal output from the light reception signal holding unit 34 to specify the position of a detected thing in the light receiving cell CR. Consequently, the position of the thing which is in contact or adjacent is specified.

In the backlight 2, when the light $L_W$ emitted from the white LED 62W enters the light guide plate 61, a part of the light $L_W$ propagates in the light guide plate 61 by total reflection and goes upward from the light emitting face 61A of the light guide plate 61 due to the groove 61C. A part of the light $L_W$ goes downward from the rear face 61B of the light guide plate 61 due to the groove 61C. The outgoing light is reflected by the first reflection film 81 and enters again the light guide plate 61.

The light $L_W$ which goes upward from the light emitting face 61A of the light guide plate 61 passes through the diffuser 71, the diffusion film 72, and the lens film 73 in order and is applied to the input/output panel 1. The light $L_W$ applied to the input/output panel 1 in such a manner is modulated in the input/output panel 1 on the basis of the display data as described above, thereby displaying an image. When the light $L_W$ is reflected by a thing which is in contact with or adjacent to the input/output panel 1, as described above, the amount of the reflected light is detected by the light receiving sensor 115, and the position is detected.

On the other hand, when the light $L_{IR}$ generated from the IR LED 62IR of the backlight 2 enters the light guide plate 61, a part of the light $L_{IR}$ propagates in the light guide plate 61 by total reflection and, after that, goes upward from the light emitting face 61A of the light guide plate 61. A part of the light $L_{IR}$ goes downward from the rear face 61B of the light guide plate 61 by the groove 61C.

In this case, on the rear face 61B side of the light guide plate 61, the first reflection film 81 reflecting the light $L_W$ from the white LED 62W and transmitting the light $L_{IR}$ from the IR LED 62IR and the second reflection film 82 reflecting at least the light $L_{IR}$ from the IR LED 62IR are provided. Therefore, the light $L_{IR}$ going downward from the rear face 61B of the light guide plate 61 passes through the first reflection film 81, is reflected by the second reflection film 82, and enters again the light guide plate 61. Consequently, even in the case where the light $L_{IR}$ from the IR LED 62IR passes through the first reflection film 81, loss of the light $L_{IR}$ from the IR LED 62IR is suppressed.

The light $L_{IR}$ which goes upward from the light emitting face 61A of the light guide plate 61 passes through the diffuser 71, the diffusion film 72, and the lens film 73 in order and is applied to the input/output panel 1. The light $L_{IR}$ applied to the input/output panel 1 in such a manner is reflected by a thing which is in contact with or adjacent to the input/output panel 1, as described above, the amount of the reflected light is detected by the IR sensor 115IR, and the position is detected.

As described above, in the embodiment, on the rear face 61B side of the light guide plate 61, the first reflection film 81 reflecting the light $L_W$ from the white LED 62W and transmitting the light $L_{IR}$ from the IR LED 62IR and the second reflection film 82 reflecting at least the light $L_{IR}$ from the IR LED 62IR are provided, so that loss of the light $L_{IR}$ from the IR LED 62IR is suppressed. Therefore, by constructing the displaying/imaging apparatus with the backlight 2, reduction in power consumption is realized.

Modification

Figure 10:
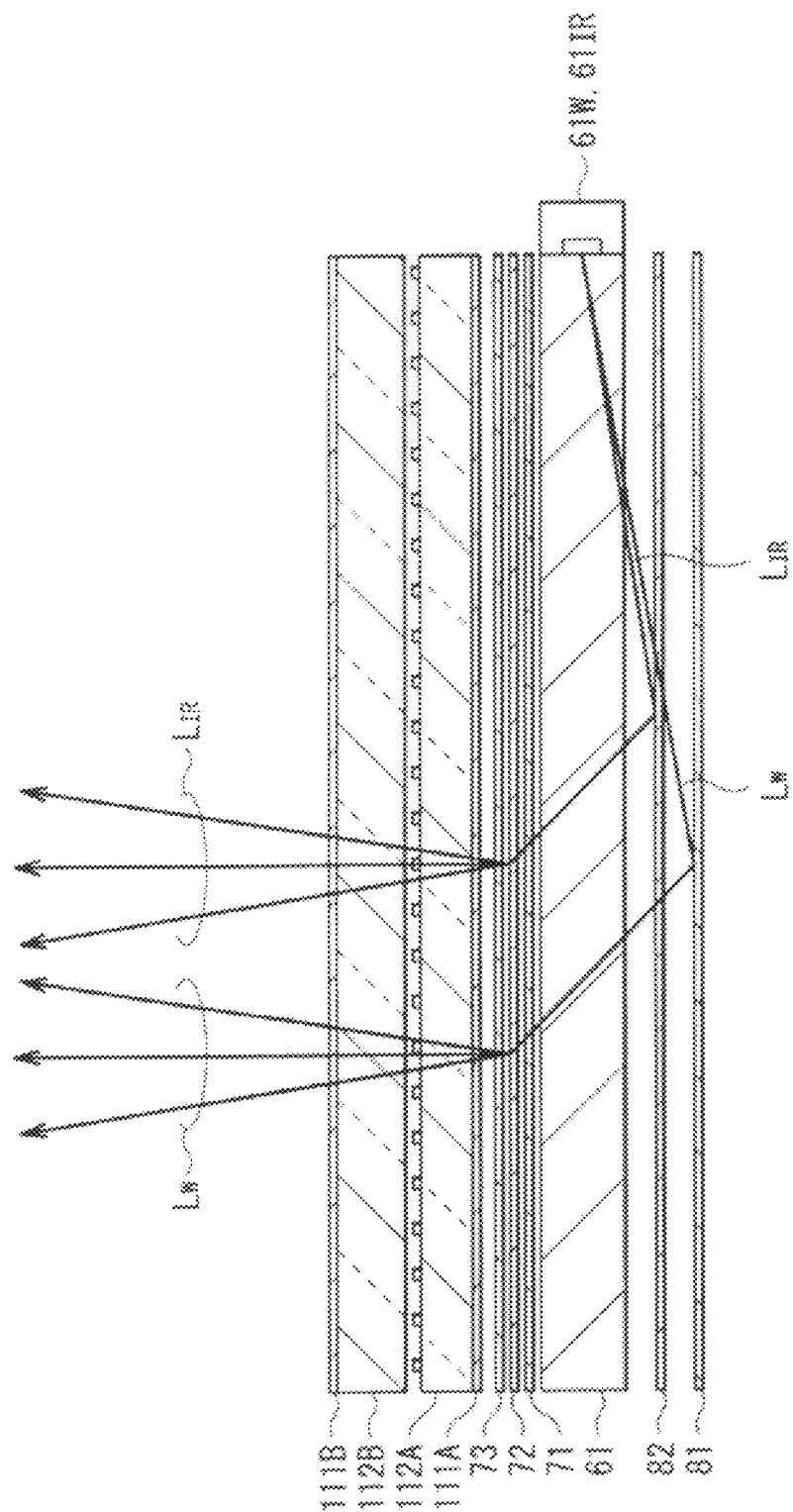
FIG. 10 is a cross section illustrating the configuration of a backlight according to a modification.

In the foregoing embodiment, the case where the second reflection film 82 reflects the light $L_W$ and $L_{IR}$ from the white LED 62W and the IR LED 62IR has been described. The second reflection film 82 may transmit the light $L_W$ from the white LED 62W and reflect the light $L_{IR}$ from the IR LED 62IR. Concretely, the second reflection film 82 may be constructed by an optical multilayer reflection film made of polyester or the like in a manner similar to the first reflection film 81. By controlling the thickness of the multilayer film, the light $L_W$ from the white LED 62W is allowed to pass, and the light $L_{IR}$ from the IR LED 62IR is reflected. In this case, the second reflection film 82 may be disposed on the rear face side opposite to the light reflection face of the first reflection film 81 as illustrated in FIG. 5. Alternatively, the second reflection film 82 and the first reflection film 81 may be provided in this order on the rear face 61B side of the light guide plate 61 as illustrated in FIG. 10.

Although the embodiments of the present invention have been described above, the invention is not limited to the embodiments and the like, but various modifications are possible. For example, although the case where the second reflection film 82 is obtained by forming a silver layer on the surface of a white PET plate by vapor deposition or the like has been described, the second reflection film 82 may be constructed by an optical multilayer reflection film made of polyester in a manner similar to the first reflection film 81. In this case, by controlling the number of layers of the multilayer film and the thickness, the light $L_W$ and $L_{IR}$ from the white LED 62W and the IR LED 62IR are allowed to be reflected.

For example, in the foregoing embodiment, the white light source is used as the visible light source and the infrared light source is used as the invisible light source. Alternatively, a visible light source or an invisible light source of other wavelength ranges may be employed. Further, in the foregoing embodiment, the case of using the white LED 62W as the white light source and using the IR LED 62IR as the infrared light source has been described. The light sources are not limited to LEDs but other light sources may be used.

In addition, for example, in the embodiment, the case of providing one light receiving cell for one light emission cell as illustrated in FIG. 2 has been described. One light receiving cell may be provided for a plurality of light emitting cells.

Further, the configuration that the displaying/imaging apparatus in the embodiment uses the liquid crystal display panel as the input/output panel has been described. Alternatively, the displaying/imaging apparatus of the invention may have a configuration of using an organic electroluminescence (EL) panel or the like as the input/output panel. The organic EL element has the property of performing light emitting operation when forward bias voltage is applied, receiving light when reverse bias voltage is applied, and generating current. Consequently, the organic EL element has a display element and a light receiving element.

It should be understood by those skilled in the art that various modifications, combinations, sub-combinations and alterations may occur depending on design requirements and other factors insofar as they are within the scope of the appended claims or the equivalents thereof.

What is claimed is:

1. A backlight comprising:
   a light guide plate having a light emitting face and a rear face opposed to the light emitting face;
   a visible light source disposed on a side face of the light guide plate;
   an invisible light source disposed on a side face of the light guide plate;
   a first reflection film disposed on the rear face side of the light guide plate, reflecting light from the visible light source, and transmitting light from the invisible light source; and
   a second reflection film disposed on the rear face side of the light guide plate and reflecting light from at least the invisible light source out of the visible light source and the invisible light source.

2. The backlight according to claim 1, wherein the second reflection film reflects light from the visible light source and the invisible light source, and is disposed on the rear face side opposite to the light reflection face of the first reflection film.

3. The backlight according to claim 1, wherein the second reflection film transmits light from the visible light source and reflects light from the invisible light source.

4. The backlight according to claim 1, wherein the visible light source is a white light source, and the invisible light source is an infrared light source.

5. A displaying/imaging apparatus comprising:
   an input/output panel having a display element and a light receiving element; and
   a backlight emitting light to the input/output panel,
   wherein the backlight includes
   a light guide plate having a light emitting face and a rear face opposed to the light emitting face,
   a visible light source disposed on a side face of the light guide plate,
   an invisible light source disposed on a side face of the light guide plate,
   a first reflection film disposed on the rear face side of the light guide plate, reflecting light from the visible light source, and transmitting light from the invisible light source, and
   a second reflection film disposed on the rear face side of the light guide plate and reflecting light from at least the invisible light source out of the visible light source and the invisible light source.

* * * * *